LEGEND. ⊙ TABLE II
☐ TABLE III
△ TABLE IV

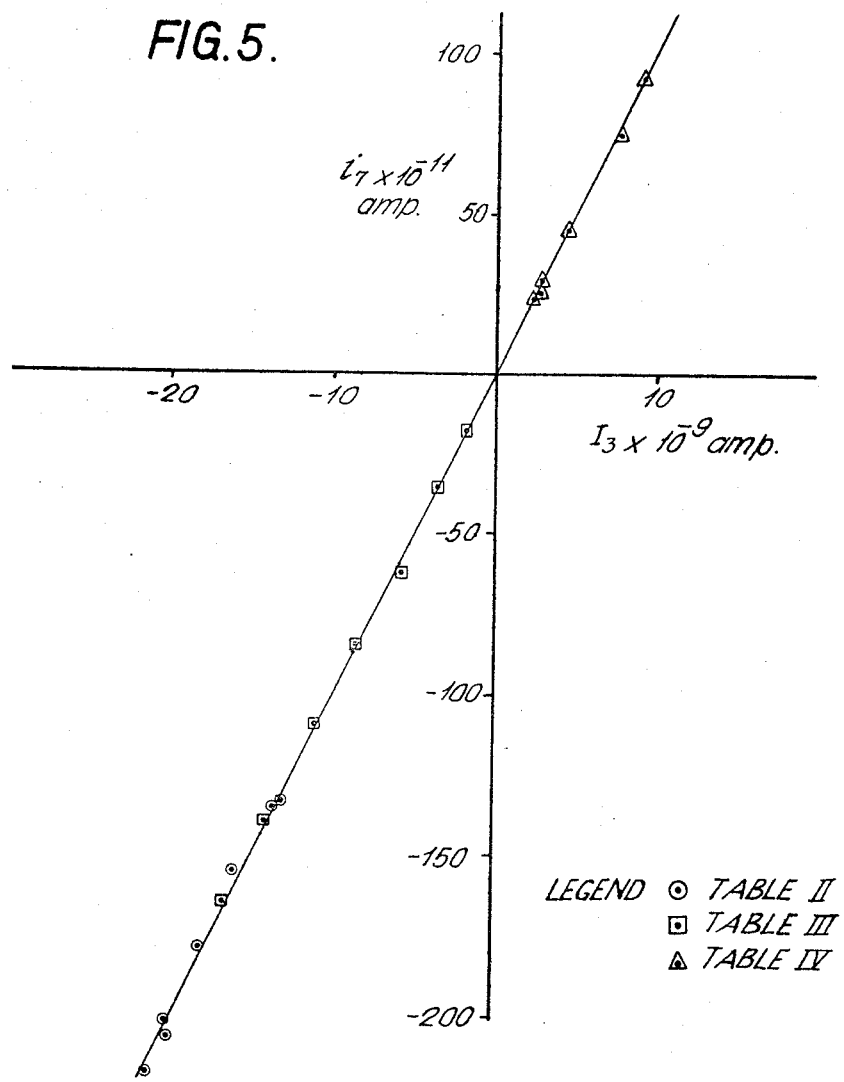

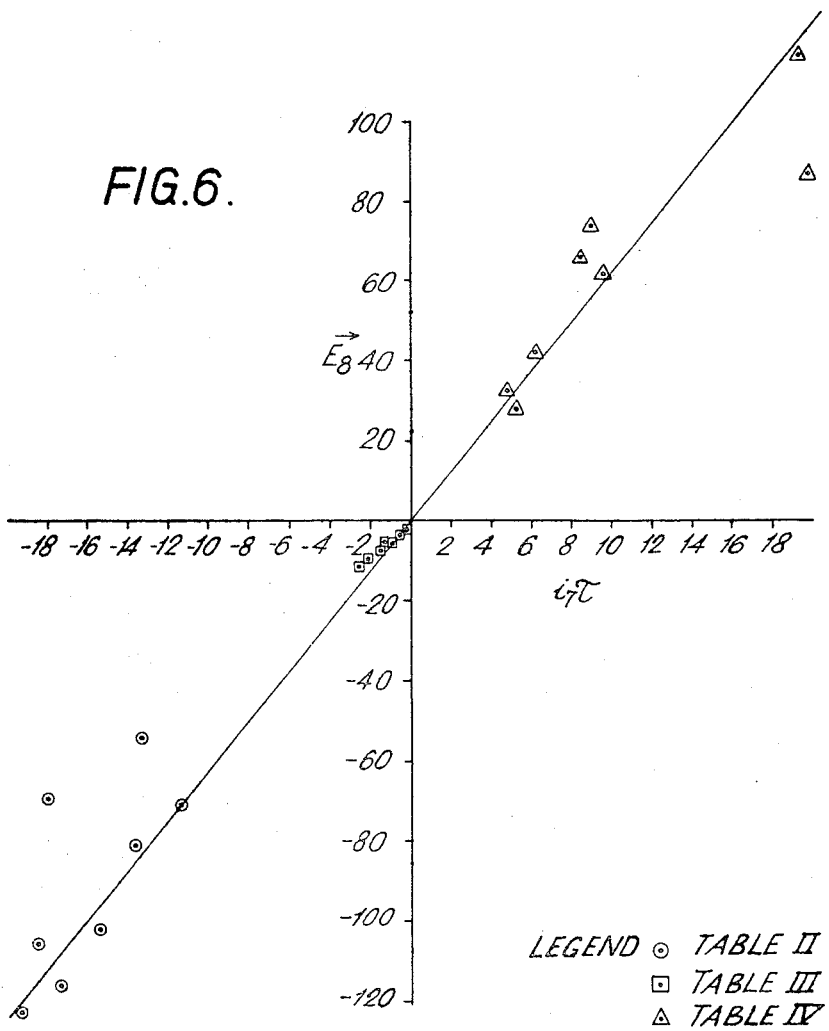

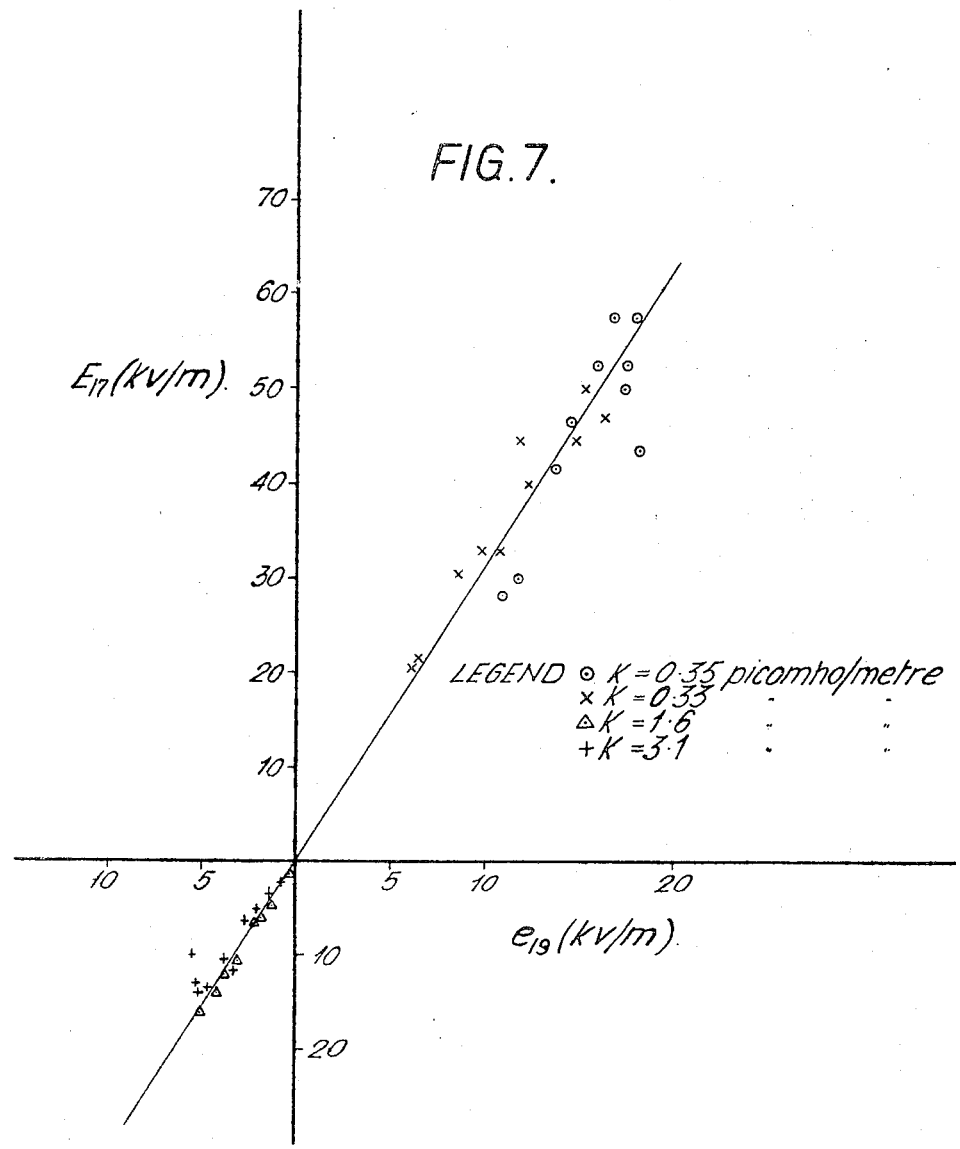

United States Patent Office 3,405,722
Patented Oct. 15, 1968

3,405,722
METHOD FOR MONITORING THE GENERATION OF STATIC ELECTRICITY IN FLUID TRANSFER SYSTEMS
John Alastair Carruthers and Leon James Stephen Prince, Sunbury-on-Thames, England, assignors to The British Petroleum Company Limited, London, England, a British joint-stock corporation
Continuation of application Ser. No. 452,441, Apr. 15, 1965, which is a continuation of application Ser. No. 213,920, Aug. 1, 1962. This application Aug. 2, 1966, Ser. No. 569,752
Claims priority, application Great Britain, Aug. 16, 1961, 29,544/61
7 Claims. (Cl. 137—2)

ABSTRACT OF THE DISCLOSURE

A method of detecting the value of electrostatic conditions in a storage tank. A portion of the fluid flow in the supply line to the storage tank is diverted to a simulation tank through a bleed-off line. The electrostatic properties of the bleed-off line are related to the electrostatic properties of the supply line between the bleed-off point and the storage tank. An electrostatic property within the simulation tank is then measured as an indication of conditions in the storage tank.

---

This application is a continuation of applications Ser. No. 213,920 filed Aug. 1, 1962 (now abandoned), and Ser. No. 452,441 filed Apr. 15, 1965 (now abandoned), both of these cases being filed in the names of John Alastair Carruthers and Leon James Stephen Prince.

This invention relates to a method for determining and controlling the generation of static electricity during fluid transfer operations.

During fluid transfer operations electrical charges are generated by the fluid undergoing transfer, particularly if the fluid passes through a filter. If the fluid is of high or moderately high electrical conductivity the charges rapidly leak away, or "relax." If the fluid is of low electrical conductivity the charges do not rapidly leak away and an electrostatic field of progressively increasing strength builds up within the body of the fluid.

When fluids of low conductivity are moved through a transfer system the electrical charges generated may produce high potential differences between various sections of the transfer system and between the fluid and its surroundings. Such high potential differences may produce electrical discharges which may release sufficient energy to cause ignition of an inflammable gaseous mixture. Hazardous situations may therefore arise during, and within a short period after, the transfer to previously empty or partially filled vessels of certain materials which are of low electrical conductivity and which can form explosive mixtures with air, for example products of petroleum origin, especially distillate fuels, and organic dry cleaning solvents. By a short period we mean a period which normally is of the order of a few minutes but which abnormally can be of the order of an hour or even longer. Many fires and explosions which have occurred during thee transfer of such fluids have been attributed to sparks caused by the discharge of static electricity.

Potential differences between various metal sections of the transfer system may be eliminated by electrically bonding and earthing the transfer system. Potential differences between a fluid of low electrical conductivity and its surroundings cannot be eliminated in this manner, however.

Since the electric charge generated by a moving fluid is a function increasing with the rate of flow of the fluid, it is common practice in situations considered potentially dangerous with regard to ignition from a discharge from static electricity to restrict rates of flow of inflammable materials to an arbitrary maximum value at which it is assumed that all fluid products may be transferred with safety.

The maximum value may be of the order of 20 feet per second unless a second phase such as water or air is being transferred together with the fluid in which case the flow rate may be reduced to the order of 3 feet per second. It has been found that the presence of a second phase greatly increases the generation of static electricity. These flow rate restrictions are applied in situations thought to be particularly hazardous, such as the start of pumping.

In practice, fluids differ greatly in their capabilities to generate static electricity. The restriction on rates of flow must be sufficiently severe to prevent the fluid with the greatest generating capability from reaching a dangerous potential and must therefore be unnecessarily stringent for all other fluids. Such unnecessary restrictions are objectionable, particularly in fuelling operations and especially in aircraft fuelling operations in which it is desirable to pump at very high flow rates and in which there is an ever growing demand to increase flow rates.

It has been proposed to relate the flow rate of hydrocarbon liquids discharging into a tank according to the electrostatic activity within the tank. Apparatus has been disclosed comprising a storage tank within which is located radio means for detecting electrical discharges and transmitting corresponding signals, and outside of which is located a valve, actuated by the signals, for controlling the influx of liquid to the tank. However, such apparatus is complex and expensive and its presence within a tank is often undesirable and inconvenient and may also, by its electrical nature, present a hazard which, although it may be made small by suitable design, will nevertheless be finite.

Moreover, the operation of such apparatus is based on the dangerous assumption that the first discharge which occurs within a tank does not cause an explosion.

To date, in order to ensure the safe and rapid transfer of certain fluids of low electrical conductivity which can form explosive mixtures with air, it has been proposed to add anti-static additives to such fluids.

We have found that such fluids may be transferred safely and rapidly, free of antistatic additives, using the apparatus to be described hereinafter.

It is an object of this invention to provide a method for determining a value of an electrostatic property or properties of a fluid within a storage tank, the value being a function of static electrical charges generated by the flow of the fluid to the storage tank.

It is further an object of this invention to provide a fluid transfer system, adapted to correlate the rate of flow of fluid into a storage tank with the value of an electrostatic property produced within the storage tank by electrical charges generated during flow, and, if desired, to provide a warning.

It is a still further object of this invention to achieve the foregoing objects without necessitating the provision of measuring, detecting or transmitting equipment within the storage tank.

We have discovered that it is possible to divert a proportion of fluid from a product supply line, and provided that there is no filter after the diversion point and before the storage tank, and provided that the fluid is diverted into a line in which it flows for a time substantially the same as that for which the fluid flows between the diversion point in the main product supply line and storage, and provided that the environment of the fluid in the diversion, or "bleed-off," line has electrostatic properties of the same order as the environment of the fluid in the main product supply line, then the electrical charge on the fluid leaving the bleed-off line is an effectively constant fraction of the electrical charge entering the storage tank, and that it is therefore possible, making electrical measurements on the fluid leaving the bleed-off line, to determine the electrical charge entering the storage tank.

Charges are developed within the supply line and bleed-off line. The bleed-off point is generally immediately after a filter or other device of high surface area presented to the fluid, and it has been found that the charges developed by the fluid in the lines after the bleed-off point are much smaller than those developed in passage through the filter, and therefore the effect of the charges developed in the lines may be neglected.

We have also discovered that the values of electrical properties possesed by a fluid as it leaves a supply line are proportional to those possessed by a fluid as it leaves the bleed-off line. The proportion factor, termed the "scale factor" may be determined experimentally. Thus, as an example if it is necessary to know the electrical current leaving the supply line, this can be determined by measuring the electrical current leaving the bleed-off line, and multiplying this by the scale factor.

We have also discovered that if the fluid, on leaving the product supply line, flows into subsequent equipment, then the values of electrical properties produced in that equipment by the presence of the electrically charged fluid are similar, apart from further "scale-factors" which can be determined experimentally, to that produced in like equipment at the end of the bleed-off line. Thus, if it is required to know the value of some electrical quantity, such as the electrical field, inside some such equipment, such as a product storage tank at the end of the supply line, then this may be determined by a suitable electrical measurement, such as of electric field strength inside a small storage tank attached to the end of the bleed-off line, termed a simulation tank.

According to the present invention there is provided a method for use in determining a value of an electrostatic property within a storage tank when the value results from electrical charges generated by the transfer of a fluid to the storage tank, the method comprising the use of a supply line connectable to the storage tank, a bleed-off line and a measuring instrument associated with the bleed-off line, the dimensions of the bleed-off line and the supply line downstream of the bleed-off line and the position of the measuring instrument being such that the residence time of fluid within the bleed-off line from the bleed-off point to the position of the instrument is substantially the same as the residence time of fluid within the supply line downstream of the bleed-off line.

According to a modification of the invention there is provided a method for use in determining a value of an electrostatic property within a storage tank when the value results from electrical charges generated by the transfer of a fluid to the storage tank, the method comprising the use of (a) a supply line connectable to the storage tank, (b) a bleed-off line, (c) a simulation tank, the bleed-off line connecting from the supply line to the simulation tank, the dimensions of the bleed-off line and the supply line downstream of the bleed-off line being such that the residence time of fluid within the bleed-off line is substantially the same as the residence time of fluid within the supply line downstream of the bleed-off line, and (d) a measuring instrument for determining the value of the electrostatic property within the simulation tank.

Suitably the measuring instrument is an electric field strength meter.

According to a further feature of the invention there is provided a fluid product supply system comprising, the use of measuring instrument being capable of giving rise to a signal the nature of which is a value of an electrostatic property within the simulation tank, and actuating the liquid flow control means according to the signal.

Preferably the signal is an electrical signal.

Suitably the system comprises an amplifier whereby, in use, the electrical signal is amplified, the amplified signal being employed to actuate the control means.

Suitably the control means comprises an electrically operated valve.

The system may also comprise equipment adapted to record the value of the electrostatic property of the storage tank and/or of the simulation tank and may also comprise equipment adapted to give rise to an alarm when the value of the electrostatic property reaches a dangerous level. The alarm may be visible and/or audible.

Preferably the residence time of the minor proportion is within the range of +10% of the residence time of the major proportion.

The most convenient electrostatic property which may be measured is the electrical field strength within the simulation tank. This may be measured in a particular region or regions of the simulation tank by conventional instruments.

The relationship between the electrical field strength of the simulation tank and that of the storage tank is a mathematical function of dimensions, provided that the charge density of the fluid through each tank is the same in each tank. See Vellenga, S. J. "Estimating the Electrical Field Inside a Rectangular Tank with Boundaries at Zero Potential." Appl. Sci. Res., volume 9, section B, pages 35–44 (copy available in Scientific Library as of May 2, 1961). Electrical field strength may vary from place to place within a tank, but the variations may be estimated in simple cases. In practice, charged mists and sharp projections within a tank may alter the expected variations but may be allowed for by a safety factor or by additional simulation devices within the simulation tank.

The invention has been described with reference to the measurement of electrical field strength, but the value of any other relevant property may be measured either alternatively or simultaneously.

A safety factor relating a physical measurement, for instance electric field strength, to the degree of hazard involved can be made an arbitrarily variable parameter in the control means. The control system may then control and give information or static hazards as before, and its sensitivity and/or warning levels may at any time be altered in the light of subsequent findings.

A liquid product supply system according to the present invention is particularly suitable for use in aircraft fuelling operations, the system easily permitting the incorporation of itself in a fuelling vehicle when the system is used to fuel an aircraft. The system is also particularly suitable for use in installations charging fuelling vehicles and road tankers. It is also particularly suitable for other installations handling and transferring petroleum products, such as in oil refineries, loading jetties, etc.

The invention is illustrated by but not limited with reference to FIGURES 1–7 of the accompanying drawings, wherein.

Figure 3:
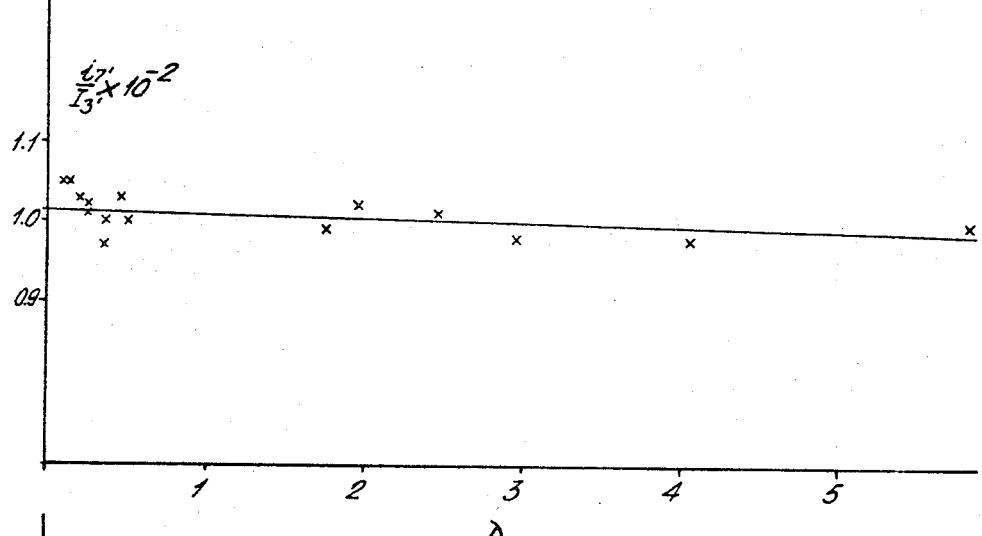

FIGURE 3 is a graph in which the ratio of the electrical current flowing in line 7 of the apparatus hereinafter described with reference to FIGURE 1, to the electrical current flowing in line 3 is plotted against $\lambda$, the ratio of the residence time of fluid flowing in the line 3 or the line 7 to the relaxation time of the fluid.

The relaxation time of the fluid, $\tau$, is equal to $19.5/K$ seconds, where K is the conductivity of the fluid in picomho/meter.

Figure 4:
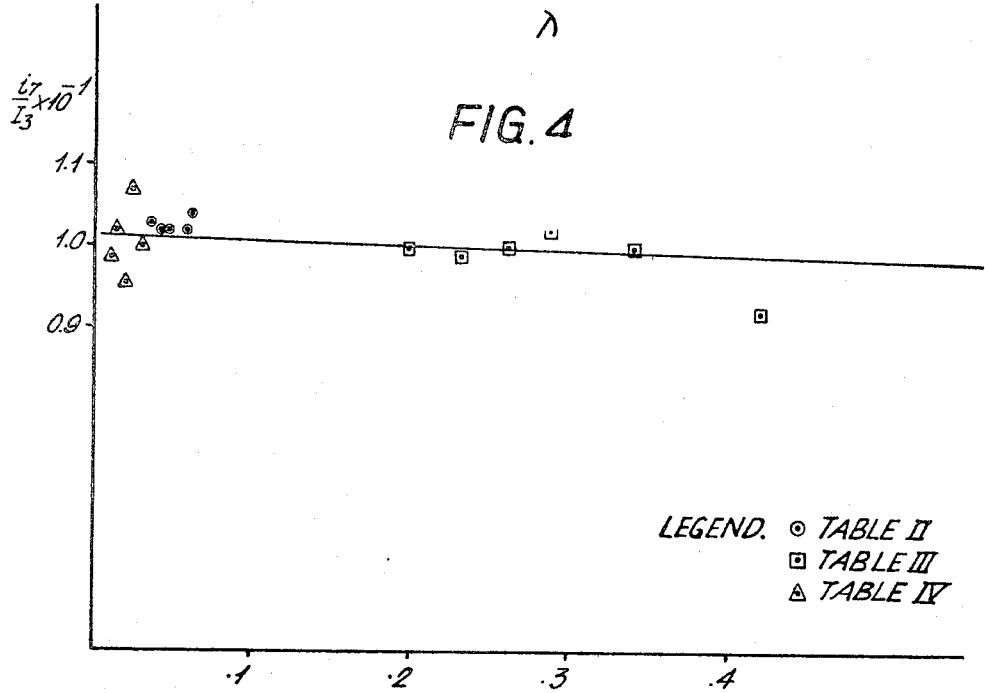

FIGURE 4 is a graph in which the ratio of the current leaving line 7 to the current leaving line 3 is plotted against $\lambda$.

FIGURE 5 is a graph in which the value of $i_7$, the current flowing in line 7, is plotted against the value of $I_3$, the current flowing in line 3.

FIGURE 6 is a graph in which $E_8$, the field strength in the can 8, is plotted against $\tau$.

FIGURE 7 is a graph in which $E_{17}$ the field strength in the storage tank 17 is plotted against $e_{19}$ the field strength in the simulation tank 19.

Figure 1:
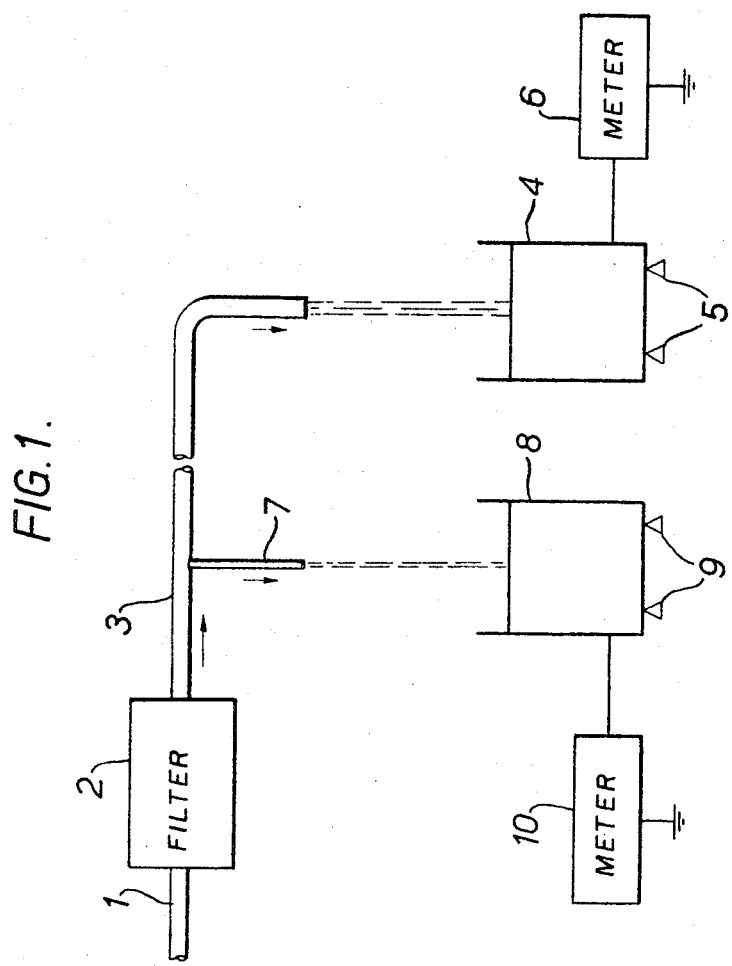
FIGURE 1 is a schematic diagram of laboratory equipment.

With reference to FIGURE 1.

A storage vessel, not shown, is connected by means of a line 1, through a filter 2, to a line 3, discharging into a metal can 4, supported on insulators 5 and connected to an earthed electrometer 6. A bleed-off is taken from the line 3 by a line 7, discharging into a can 8, supported on insulators 9 and connected to an earthed electrometer 10.

The diameters of the bleed-off line 7 and the line 3 are such that the residence time of liquid within the bleed-off line 7 is the same as the residence time of liquid within that section of the line 3 downstream of the bleed-off line 7.

Figure 2:
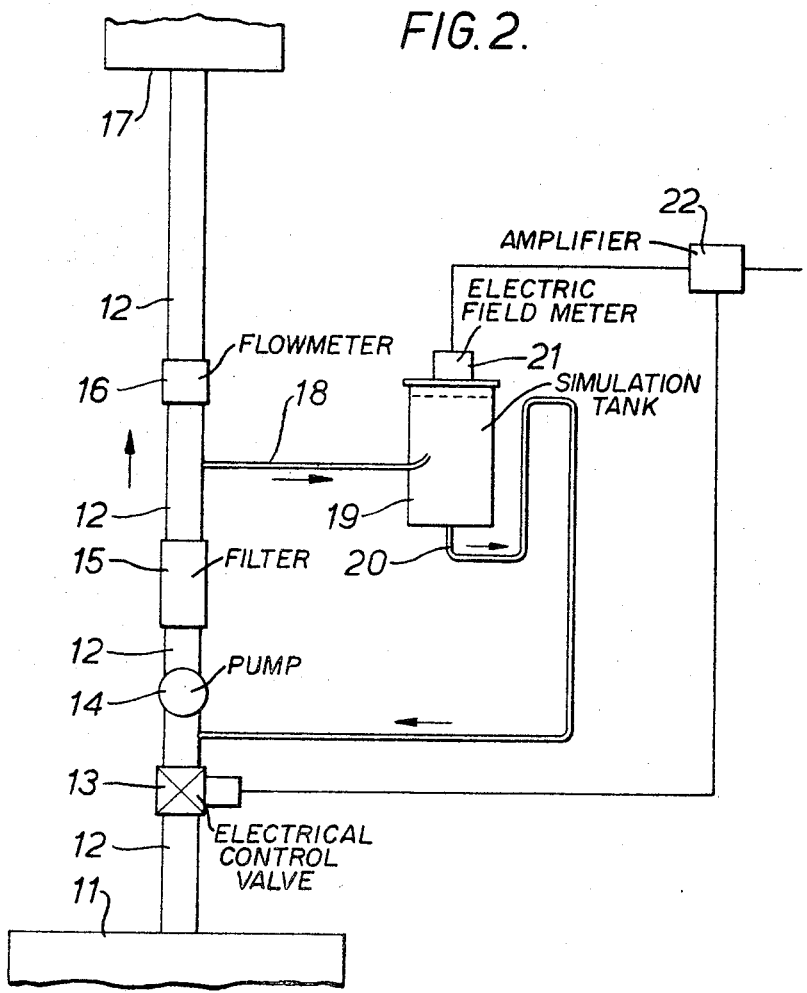
FIGURE 2 is a schematic diagram of a liquid product supply system.

With reference to FIGURE 2.

A storage tank 11 is connected by means of a line 12, through an electrically operated control valve 13, through a pump 14, through a filter 15 and through a liquid flowmeter 16 to a second storage tank 17. A bleed-off is taken from the line 12 by a line 18 which leads to a simulation tank 19. An outlet pipe 20, designed to maintain the simulation tank 19 almost but not quite full of liquid, returns excess liquid to the suction side of the pump 14. An electric field meter 21 forms the head of the simulation tank 19, and gives rise to electrical signals which are a measure of the field strength within the simulation tank 19 and hence within the storage tank 17. The electric field meter 21 is electrically connected to an amplifier 22 from which amplified signals control the valve 13 by manual or automatic means and from which signals may also actuate recording mechanism (not shown) and/or a safety alarm system (not shown).

The diameters of the bleed-off line 18 and the line 12 are such that the residence time of liquid within the bleed-off line 18 is the same as the residence time of liquid within that section of the line 12 downstream of the bleed-off line 18.

In use, liquid passing through the filter 15 becomes highly charged. Most of the charge is generated in the filter 15; as fuel passes through the line 12 and the bleed-off 18 some of the charge relaxes, the amount of relaxation depending on the residence time of the fuel in the lines and on the conductivity of the liquid. Thus only a fraction of the charge generated enters the storage tank 17 and the simulation tank 19. The residence time of the fuel within the bleed-off line 18 is the same as the residence time of the fuel within the line 12 and therefore the same fraction of the initial charge density reaches the simulation tank 19 and the storage tank 17. Then, subject to certain precautions in designing the bleed-off line and simulation tank, the electrical field in the simulation tank 19 is a constant fraction of the electric field in the storage tank 17.

The invention is further illustrated by but not limited with reference to the following examples.

*Example 1*

Iso-octane was passed through the apparatus described with reference to FIGURE 1 of the drawing at various flow rates. The electrical currents $I_3$ and $i_7$ issuing from the line 3 and the bleed-off line 7 respectively, were measured.

The line 3 and the bleed-off line 7 had the following dimensions:

|  | Cms. |
|---|---|
| Length of line 3 | 103 |
| Internal diameter of line 3 | 0.476 |
| Length of bleed-off line 7 | 63 |
| Internal diameter of bleed-off line 7 | 0.198 |

With these dimensions the residence time (T) in line 3, for varying rates of flow is substantially equal to the residence time (t) in the bleed-off line 7, as is shown by the following Table I. The rate of flow in line 3 is denoted by Q cc./sec. and in the bleed-off line 7 by q cc./sec.

TABLE I

| Q | q | T | t | t/T |
|---|---|---|---|---|
| 23.9 | 2.59 | 0.770 | 0.754 | 0.98 |
| 28.7 | 3.1 | 0.644 | 0.629 | 0.98 |
| 36.0 | 3.8 | 0.511 | 0.514 | 0.01 |
| 63.7 | 4.55 | 0.421 | 0.428 | 1.02 |
| 49.3 | 5.0 | 0.373 | 0.390 | 1.05 |
| 54.5 | 5.55 | 0.338 | 0.351 | 1.04 |
| 59.8 | 5.98 | 0.308 | 0.327 | 1.06 |
| 65.7 | 6.55 | 0.280 | 0.298 | 1.6 |
| 83.2 | 8.17 | 0.221 | 0.238 | 1.08 |
| 84.2 | 8.17 | 0.219 | 0.238 | 1.08 |

Having then ascertained that the residence times are substantially equal at all flow rates available the results set out in the following Tables II–IV were obtained:

$I_3$=current in line 3
$i_7$=current in bleed-off line 7
$K$=conductivity of fuel in picomho/meter
$\tau$=relaxation time of fuel=19.5/$K$ sec.
$E_8$=electric field strength in volts/cm.

TABLE II

| Q | q | $I_3\times(10^{-11})$ amp | $I_7\times(10^{-11})$ amp | K | $\tau$ | $(-I_7\tau)\times(10^{-9})$ | $I_3\tau\times(10^{-9})$ | $i_7/I_3\times(10^{-1})$ | $E_8$ | q/Q | t | t/$\tau$ |
|---|---|---|---|---|---|---|---|---|---|---|---|---|
| 37 | 3.9 | −19.9 | −202 | 2.2 | 8.87 | 17.9 | 177 | 1.02 | −69 | .105 | 5.1 | .0575 |
| 29 | 3.1 | −12.9 | −133 | 1.9 | 10.3 | 13.3 | 137 | 1.04 | −54 | .107 | 6.3 | .0611 |
| 44 | 4.5 | −21.3 | −218 | 2.3 | 8.48 | 18.5 | 181 | 1.02 | −108 | .102 | 4.3 | .0507 |
| 49 | 5.1 | −22.5 | −230 | 2.3 | 8.48 | 19.5 | 191 | 1.02 | −123 | .104 | 3.9 | .0460 |
| 55 | 5.5 | −17.9 | −182 | 2.3 | 8.48 | 15.4 | 152 | 1.02 | −102 | .100 | 3.5 | .0413 |
| 44 | 4.5 | −15.9 | −161 | 2.3 | 8.48 | 13.6 | 135 | 1.01 | −81 | .102 | 4.3 | .0507 |
| 36 | 3.8 | −13.5 | −135 | 2.3 | 8.48 | 11.4 | 114 | 1.00 | −71 | .106 | 5.3 | .0626 |
| 66 | 6.6 | −19.8 | −205 | 2.3 | 8.48 | 17.4 | 168 | 1.03 | −116 | .100 | 3.0 | .0354 |

TABLE III

| Q | q | $I_3\times(10^{-11})$ amp | $I_7\times(10^{-11})$ amp | K | $\tau$ | $(-I_7\tau)\times(10^{-9})$ | $I_3\tau\times(10^{-9})$ | $i_7/I_3\times(10^{-1})$ | $E_8$ | q/Q | t | t/$\tau$ |
|---|---|---|---|---|---|---|---|---|---|---|---|---|
| 44 | 4.5 | −5.8 | −59 | 13.0 | 1.5 | 0.885 | 8.70 | 1.02 | −5 | .102 | 4.3 | .286 |
| 37 | 3.9 | −3.5 | −35 | 13.0 | 1.5 | 0.525 | 5.25 | 1.00 | −3 | .105 | 5.1 | .340 |
| 29 | 3.1 | −1.85 | −17 | 13.0 | 1.5 | 0.255 | 2.18 | .920 | −2 | .107 | 6.3 | .420 |
| 55 | 5.5 | −11.0 | −109 | 13.0 | 1.5 | 1.63 | 1.65 | .991 | −7 | .100 | 3.5 | .234 |
| 49 | 5.1 | −8.60 | −86 | 13.0 | 1.5 | 1.4 | 14.0 | 1.00 | −5 | .104 | 3.9 | .260 |
| 66 | 6.6 | −16.5 | −165 | 12.8 | 1.52 | 2.51 | 25.1 | 1.00 | −11 | .100 | 3.0 | .197 |
| 60 | 6.0 | −14.0 | −139 | 12.8 | 1.52 | 2.11 | 21.3 | .994 | −9 | .100 | 3.2 | .210 |

TABLE IV

| Q | q | $I_3\times(10^{-11})$ amp | $I_7\times(10^{-11})$ amp | K | $\tau$ | $(-I_7\tau)\times(10^{-9})$ | $I_3\tau\times(10^{-9})$ | $i_7/I_3\times(10^{-1})$ | $E_8$ | q/Q | t | t/$\tau$ |
|---|---|---|---|---|---|---|---|---|---|---|---|---|
| 44 | 4.5 | +2.62 | +25 | 0.900 | 21.7 | 5.43 | 56.9 | .955 | +28 | .102 | 4.3 | .0198 |
| 55 | 5.5 | +4.40 | +45 | 0.920 | 21.2 | 9.54 | 92.9 | 1.02 | +62 | .100 | 3.5 | .0165 |
| 29 | 3.1 | +2.30 | +23 | 0.920 | 21.2 | 4.85 | 48.5 | 1.00 | +32 | .107 | 6.3 | .0292 |
| 66 | 6.6 | +9.10 | +92 | 0.920 | 21.2 | 19.70 | 193 | 1.02 | +87 | .100 | 3.0 | .0142 |
| 60 | 6.0 | +4.60 | +45 | 0.997 | 19.6 | 8.82 | 90.2 | .978 | +74 | .100 | 3.2 | .0163 |
| 49 | 5.1 | +4.20 | +43 | 0.997 | 19.6 | 8.44 | 82.4 | 1.02 | +66 | .104 | 3.9 | .0199 |
| 37 | 3.9 | +2.70 | +29 | 0.909 | 21.5 | 6.23 | 58.0 | 1.07 | +42 | .105 | 5.1 | .0237 |
| 83 | 8.2 | +7.6 | +75 | 0.76 | 25.6 | 19.2 | 195 | .987 | +120 | .101 | 2.4 | .00938 |

FIGURE 3 demonstrates that the ratio of electrical current flowing in the line 3 to the electrical current flowing in the line 7 is constant for differing values of $\tau$.

The results set out in Tables II, III, IV are shown graphically in FIGURES 4, 5 and 6, respectively.

FIGURE 4 demonstrates that the ratio $i_7/I_3$ is constant for samples of varying conductivity and samples of vary-flow rates, since $\tau$ is a function of flow rate.

FIGURE 5 also demonstrates that $i_7$ is directly proportional to $I_3$.

FIGURE 6 demonstrates that $E_8$, the field strength in the can 8 (analogous to the field strength in a simulation tank) is proportional to $i_7$.

Since $i_7\tau$ is proportional to $I_3\tau$ and $I_3\tau$ approximately equals Q, the charge in the can 4, (analogous to a storage tank) and since the charge is proportional to the field in a tank, for given dimensions and filling level, it follows that the field within the simulation tank is directly proportional to the field in the storage tank.

*Example 2*

Samples of aviation turbine kerosine (A.T.K.) were passed at varying flow rates through the liquid product supply system described with reference to FIG. 2 of the drawing. The samples possessed different electrical conductivity values. The line 12 and the bleed-off line 18 had the following dimensions:

Length of line 12 _____ feet__ 100
Internal diameter of line 12 _____ inches__ 2.5
Length of bleed-off line 18 _____ 25 feet 7 inches
Internal diameter _____ inch__ 0.085

Electrical field strengths were measured directly in both the storage tank 17 and the simulation tank 19. The results set out in the following Table V were obtained:

TABLE V

| | Field in storage tank (kv./meter) $E_{17}$ | Field in simulation tank (kv./meter) $e_{19}$ | Conductivity of A.T.K. (picomho/meter) |
|---|---|---|---|
| +ve | 28.0 | 10.6 | 0.35 |
| | 30.0 | 11.6 | 0.35 |
| | 41.5 | 13.6 | 0.35 |
| | 46.5 | 14.5 | 0.35 |
| | 52.5 | 15.9 | 0.35 |
| | 57.5 | 16.7 | 0.35 |
| | 52.5 | 17.4 | 0.35 |
| | 57.5 | 17.8 | 0.35 |
| | 43.7 | 18.1 | 0.35 |
| | 50.0 | 17.4 | 0.35 |
| +ve | 50.0 | 15.3 | 0.33 |
| | 40.0 | 12.3 | 0.33 |
| | 44.8 | 11.6 | 0.33 |
| | 33.0 | 10.6 | 0.33 |
| | 33.0 | 9.7 | 0.33 |
| | 30.3 | 8.5 | 0.33 |
| | 21.5 | 6.4 | 0.33 |
| | 20.5 | 6.0 | 0.33 |
| | 47.0 | 16.2 | 0.33 |
| | 44.8 | 14.8 | 0.33 |
| −ve | 18.5 | 5.0 | 1.6 |
| | 10.6 | 3.1 | 1.6 |
| | 12.0 | 3.9 | 1.6 |
| | 6.6 | 2.2 | 1.6 |
| | 6.2 | 1.9 | 1.6 |
| | 6.7 | 2.5 | 1.6 |
| | 4.9 | 1.2 | 1.6 |
| | 1.9 | 0.5 | 1.6 |
| | 14.0 | 4.1 | 1.6 |
| −ve | 13.0 | 5.2 | 3.1 |
| | 14.1 | 5.1 | 3.1 |
| | 13.7 | 4.6 | 3.1 |
| | 10.6 | 3.9 | 3.1 |
| | 11.9 | 3.4 | 3.1 |
| | 6.2 | 2.6 | 3.1 |
| | 5.7 | 2.2 | 3.1 |
| | 55.2 | 2.0 | 3.1 |
| | 3.2 | 1.4 | 3.1 |
| | 3.7 | 1.2 | 3.1 |
| | 2.1 | 0.9 | 3.1 |
| | 10.0 | 5.5 | 3.1 |
| | 13.0 | 5.3 | 3.1 |

The results set out in Table V are shown graphically in FIGURE 7.

FIGURE 7 demonstrates that $E_{17}$, the electric field strength in the storage tank is directly proportional to $e_{19}$, the electric field strength in the simulation tank.

What is claimed is:

1. A method of determining the value of electrostatic conditions within a storage tank when the value results from electrical charges generated by the transfer of a fluid to the storage tank via a supply line including a filter therein comprising, diverting a portion of the fluid flow from the supply line at a point after the last filter and before the storage tank to a simulation tank via a bleed-off line, said bleed-off line having electrostatic properties of the same order as that portion of the supply line between the diversion point and the storage tank, and measuring the value of an electrostatic property within the simulation tank resulting from electrical charges generated by the transfer of the fluid.

2. A method of preventing hazardous electrostatic conditions during the transfer of fluid to a storage tank which comprises measuring an electrostatic property in accordance with claim 1 and controlling the rate of fluid flow to the storage tank as a function of said measurement.

3. A method in accordance with claim 1 wherein the measured electrostatic property is the electric field strength within the simulation tank.

4. A method in accordance with claim 3 for controlling fluid flow by means of an electrically operated valve located in the supply line prior to the bleed-off line connection comprising measuring the electric field strength within the simulation tank and controlling the valve as a function of said measurement.

5. A method of determining a value of an electrostatic property within a storage tank when the value results from electrical charges generated by the transfer of a fluid to the storage tank via a supply line comprising, diverting a portion of the fluid flow from the supply line to a simulation tank via a bleed-off line, maintaining the residence time of the fluid in the supply line between the bleed-off line and the storage tank substantially equal to the residence time of the fluid under the bleed-off line, and measuring an electrostatic property within the simulation tank.

6. A method preventing hazardous electrostatic conditions during the transfer of fluid to a storage tank which comprises measuring an electrostatic property in accordance with claim 5 and controlling the rate of fluid flow to the storage tank as a function of said measurement.

7. A method in accordance with claim 1, wherein the supply line further includes a pump therein, and the fluid flow is returned from said simulation tank to the supply line at a point prior to the pump.

References Cited

UNITED STATES PATENTS

| 2,654,067 | 9/1953 | Bruce | 324—61 |
| 2,859,757 | 11/1958 | Parsons | 137—2 |
| 2,909,190 | 10/1959 | Wilson | 137—487.5 |
| 2,969,503 | 1/1961 | Bustin | 324—72 |
| 3,306,320 | 2/1967 | Bond | 324—72 XR |

RUDOLPH V. ROLINEC, *Primary Examiner.*

C. F. ROBERTS, *Assistant Examiner.*